United States Patent [19]

Leard et al.

[11] Patent Number: 5,412,382
[45] Date of Patent: May 2, 1995

[54] INTEGRATED ELECTRONIC PRIMARY FLIGHT DISPLAY

[75] Inventors: Thomas M. Leard, Carefree, Ariz.; Stephen D. Fulton, Federal Way, Wash.

[73] Assignee: Honeywell Inc., Minneapolis, Minn.

[21] Appl. No.: 175,834

[22] Filed: Dec. 30, 1993

[51] Int. Cl.6 .............................................. G01C 21/00
[52] U.S. Cl. .................................. 340/974; 340/973; 340/977; 340/978
[58] Field of Search ............... 340/971, 973, 974, 975, 340/977, 978; 364/433; 244/1 R

[56] References Cited

U.S. PATENT DOCUMENTS

| D. 257,832 | 1/1981 | Flint et al. | |
| D. 290,937 | 7/1987 | Devino | D10/67 |
| 2,660,977 | 12/1953 | Gordon | 340/973 |
| 2,685,226 | 8/1954 | Crane | 340/973 |
| 3,098,381 | 7/1963 | Little et al. | 73/179 |
| 3,537,086 | 10/1970 | Andresen, Jr. | 340/977 |
| 3,545,269 | 12/1970 | Sherbert, Jr. | 73/179 |
| 3,621,210 | 11/1971 | Canning | 340/978 |
| 3,624,366 | 11/1971 | Angus et al. | |
| 3,890,614 | 6/1975 | Argentieri et al. | 340/977 |
| 3,936,797 | 2/1976 | Andresen, Jr. | 340/977 |
| 4,112,413 | 9/1978 | Muhs et al. | 340/977 |
| 4,247,843 | 1/1981 | Miller et al. | 340/973 |
| 4,283,705 | 8/1981 | James et al. | 340/973 |
| 4,326,189 | 4/1982 | Crane | 340/977 |
| 4,583,094 | 4/1986 | Mosier | 340/973 |
| 4,626,851 | 12/1986 | Tooze | 340/973 |
| 4,860,007 | 8/1989 | Konicke et al. | 340/973 |
| 5,136,301 | 8/1992 | Bechtold et al. | 340/977 |
| 5,250,947 | 10/1993 | Worden et al. | 340/973 |

OTHER PUBLICATIONS

Aviation Week, "New Flight Indicator Introduced", Sep. 20, 1948, p. 16, cl.340-973.
Aircraft Instrumentation, McGraw-Hill Encyclopedia of Science and Technology, pp. 286-293.

Primary Examiner—Brent Swarthout
Attorney, Agent, or Firm—Gregory A. Bruns

[57] ABSTRACT

One side of a primary flight display has a vertical airspeed scale, a round dial display, and a window. The round dial display provides global or macro airspeed information and a digital display of a present airspeed value is provided in the window. A vertical altitude scale is located on a second side of the PFD with a second round dial located along the altitude scale. The second dial is configured to provide a predetermined amount of rotation of the pointer for a predetermined change in altitude. A second window located along the altitude scale provides a digital present value of altitude.

13 Claims, 2 Drawing Sheets

INTEGRATED ELECTRONIC PRIMARY FLIGHT DISPLAY

BACKGROUND OF THE INVENTION

The present invention relates generally to aircraft flight instrument systems and specifically to the airspeed indicator display portion and the altitude indicator display portion of a primary flight display.

Effective flight management is closely related to providing accurate and timely information to the pilot. The nature of the pilot's various tasks determines the general types of data which must be available. It is important to provide these data in a form best suited for use so that the pilot is not required to accomplish extensive mental processing before information can be used. If this occurs, then more information can be presented and utilized with less effort in mental processing. This can be expected to translate into fewer pilot errors. Computer generated displays offer significant advances in this direction.

Current electronic Primary Flight displays (PFD's) have a conventional attitude director (ADI) which consumes most of the available display area. The available display space for air data instruments is restricted to two strips on either side of the ADI. In the past, many display designers have settled upon the display format of the vertical tape presentation of airspeed and altitude.

Vertical tape air data displays have existed since before the advent of electronic display formats. There has been much debate about these displays and they have not been generally accepted as being equal in readability and ease of data interpretation to the round dial format.

One factor that may have contributed to some acceptability of vertical tape displays could be their initial airframe application: large, stable, long-range aircraft. Having to make few take offs and landings, and virtually no enroute maneuvering, the data transfer from the tape displays has been satisfactory. However, application of tapes to small, dynamic airframes, with dynamic missions, has proven not to be as acceptable.

The general preference for the round dial format display apparently stems in part from our inherent societal training of reading round dials, e.g., clocks, speedometers, gas gauges and other dials where the markings or indices of the dial are fixed and a movable pointer or indicator moves relative to the fixed markings. However, the round or partially round dial format conveys information not only because of the position of the movable indicator relative to a fixed marking, but also because of the position of the indicator relative to the entire dial or simply the direction in which the movable indicator is pointing. This is illustrated by the existence of clock faces without numerals and in some instances clockfaces without any fixed markings.

So even with the pilot's societal background and experience with round style dials, pilots have learned how to satisfactorily use vertical tape displays. However, the experience with dynamic airframes in the work load demand on the pilot to interrupt the vertical tape data serves to still raise the general question of mental workload demand covered by vertical tape air data displays.

Information is conveyed by the round dial format due to direction and rate of movement or rotation of the movable indicator or pointer.

Rate of movement is quite useful in the control of an aircraft. The round dial allows the pilot to judge rate of movement towards a specific value (e.g., airspeed target) or rate of movement through a range of values (e.g., altitude changes during a dive), and the pilot can evaluate the rate changes while simultaneously appreciating with the relative position of the pointer on the dial.

With respect to clocks the usefulness of the terms clockwise and counterclockwise in communication information is understood and well established. Further with respect to gauges and other round or partially round formats it is commonly understood that indicator movement in a clockwise direction or rotation indicates an increase and movement in a counterclockwise direction indicates a decrease.

In addition, a round dial display imports information as a result of the rate of movement or rotation of the movable indicator or pointer.

Vertical tape formats, on the other hand, typically display information by moving the "dial", i.e., the scale or tape, and leaving the indicator, i.e., pointer, fixed. This approach is contrary to our previous societal experience and training and therefore does not represent good human factors engineering. However, the need for maximum data resolution-in PFD's coupled with the reality of limited linear physical space has forced the display designer to this fixed pointer and moving tape combination.

A second approach to PFD's is to use a very large display area and to provide the altimeter and airspeed information in a round dial format. In addition to requiring a much larger display area, this approach results in a display that is no longer aligned in the traditional and widely accepted "basic T" format. The "basic T" flight instrument format is one in which the airspeed, attitude, altimeter and heading information form the shape of the letter "T" on the PFD.

Thus, a need exists for a PFD that provides the advantages of a round dial format for airspeed and altimeter information in the display space adjacent to a typical centrally located attitude director indicator while preserving the "basic T" instrument format.

SUMMARY OF THE INVENTION

The present invention solves these and other needs by providing a primary flight display having a vertical airspeed scale on one side with a dial having both a movable indicator located along the airspeed scale and a window located along the airspeed scale. The vertical tape portion of the airspeed display provides a macro-view of airspeed status. The dial and movable indicator provide rate of airspeed change information, as well as reinforcing the macro airspeed view. A digital display of a present airspeed value is provided in the window. A vertical altitude scale is located on a second side of the PFD with a second dial having a movable indicator also located along the altitude scale. The second dial and movable indicator are configured to provide a predetermined amount of rotation of the movable indicator for a predetermined change in altitude. A second window located along the altitude scale provides a digital present value of altitude.

The altitude scale in particular is designed to give the pilot the advantages of a round dial for altitude leveloff and capture (i.e., the "fine" altitude scale) coupled with the look ahead, or "course" altitude display features of a vertical tape. The position of the needle in the round dial provides a spatial cue for relative deviation, thus incorporating a big advantage of round dials.

DETAILED DESCRIPTION

Figure 1:
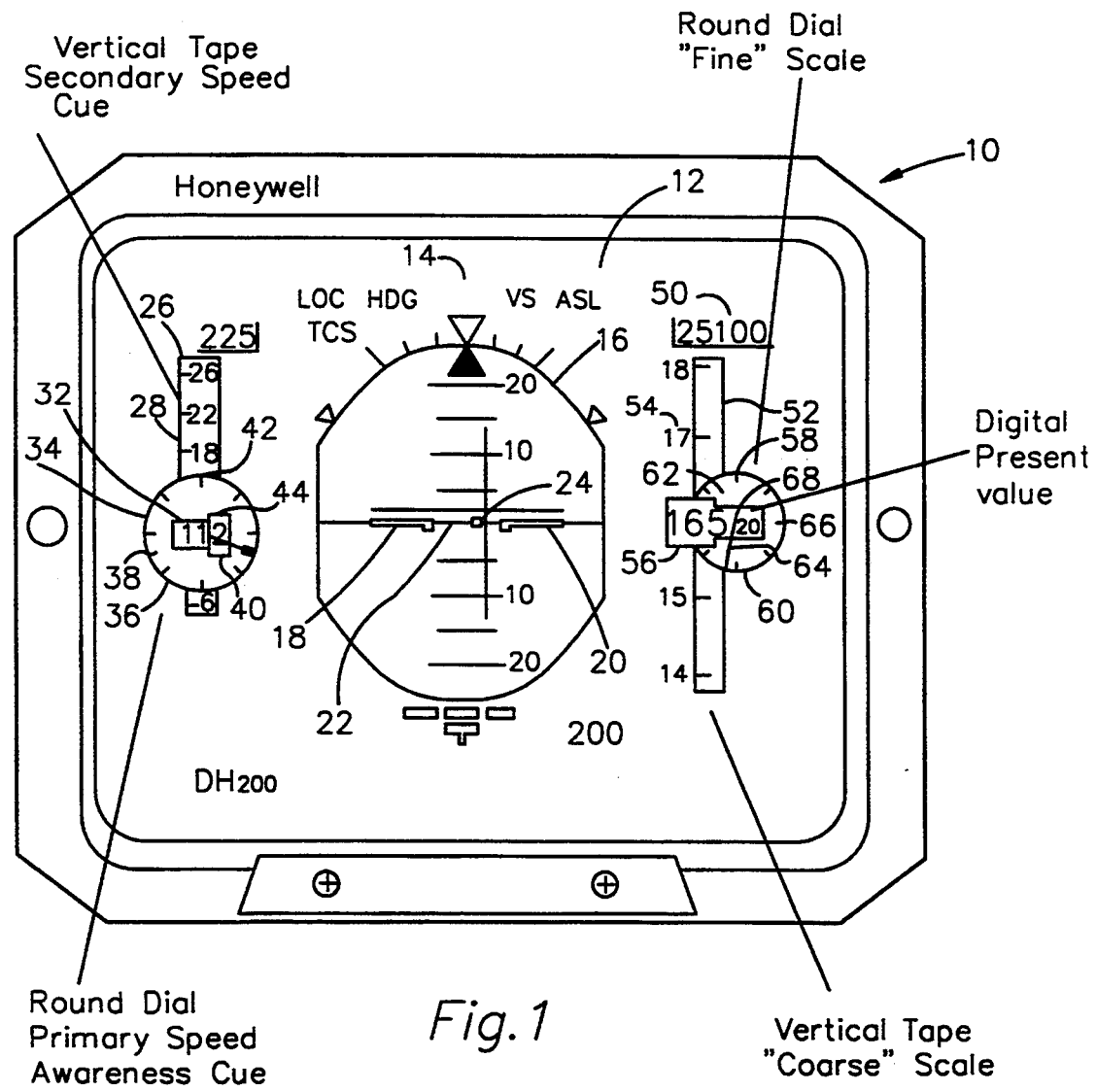
FIG. 1 is a frontal view of a primary flight display in accordance with the present invention.

A display produced in accordance with the present invention is illustrated in FIG. 1 and generally designated 10. Display 10 would be presented on a cathode ray tube screen or other electronic display means having a display field 12. Display field 12 may be divided into a number of indicators or indicating areas. A first central area 14 includes an electronic attitude director indicator (EADI) 16. EADI 16 provides aircraft attitude information and includes an aircraft reference symbols 18 and 20, an artificial horizon 22, and flight director command bars 24, and is of generally conventional design.

Adjacent and along the left side of EADI 16 is a second area which includes an air speed presentation 26 including a vertically oriented movable tape or scale 28 having numbers 30 located along tape 28. A rolling drum display or window 32 is superimposed to indicate present airspeed. A round dial,indicator 34 is superimposed on both movable tape 30 and rolling drum 32. Round dial indicator 34 includes circumference 36 dial face 38 and pointer 40. Circumference 36 includes indices 42, and dial face 38 includes center 44. Pointer 40 has a fixed end at center 44 and a rotating end Pointer 40 extends from center 44 to or nearly to circumference 36 and rotates about center 44.

Adjacent and along the right side of EADI 16 is a third area which includes an altitude presentation or altimeter 50. Altimeter 50 includes a vertically oriented movable tape or scale 52 having numbers 54 located along tape 52. A rolling drum display 56 is superimposed on movable tape 52 to indicate present altitude. A round dial indicator is superimposed on both movable tape 52 and rolling drum 56. Round dial indicator includes circumference 60, dial face 62, and pointer 64. Circumference 60 includes indices 66, and dial face 62 includes center 68. Pointer 64 has a fixed end located at center 68 and a rotating end. Pointer 64 extends from center 68 to or nearly to circumference 62 and rotates about center 68.

Now that the construction and operation of primary flight display 10 have been set forth, many advantages and subtle features can be set forth and appreciated. PFD 10 preserves the required PFD concept of the "basic T" flight instrument format, i.e., airspeed, attitude, altimeter and heading information form the shape of the letter "T" on the PFD.

Airspeed presentation 26 makes optimum use of the available area located on the left side of EADI 16. The combination of a vertical tape display 28, window display 32 and round dial display 34 provides several advantages. Movable tape 28 displays a range of airspeeds with a present value of airspeed displayed digitally in window 32. For example, in FIG. 1, the present value is indicated as 112 knots. In addition round dial display 34 provides global or macroscopic airspeed information. Information visually available from round dial 34 includes the relative position of pointer 40 relative to indices 42 on dial face 38, i.e., the reading of round dial display 34. Indices 42 could be located for example at 50 knot intervals starting at a 12 o'clock position and continuing in a clockwise direction. Additional information is imparted through the direction of pointer 40 and further information is imparted through the direction of rotation of pointer 40, that is either clockwise for increasing airspeed or counterclockwise for decreasing airspeed. Information available from round dial display 34 therefore provides improved situational awareness over past airspeed displays that provide only a movable vertical scale and a window for a digital display.

Figure 2:
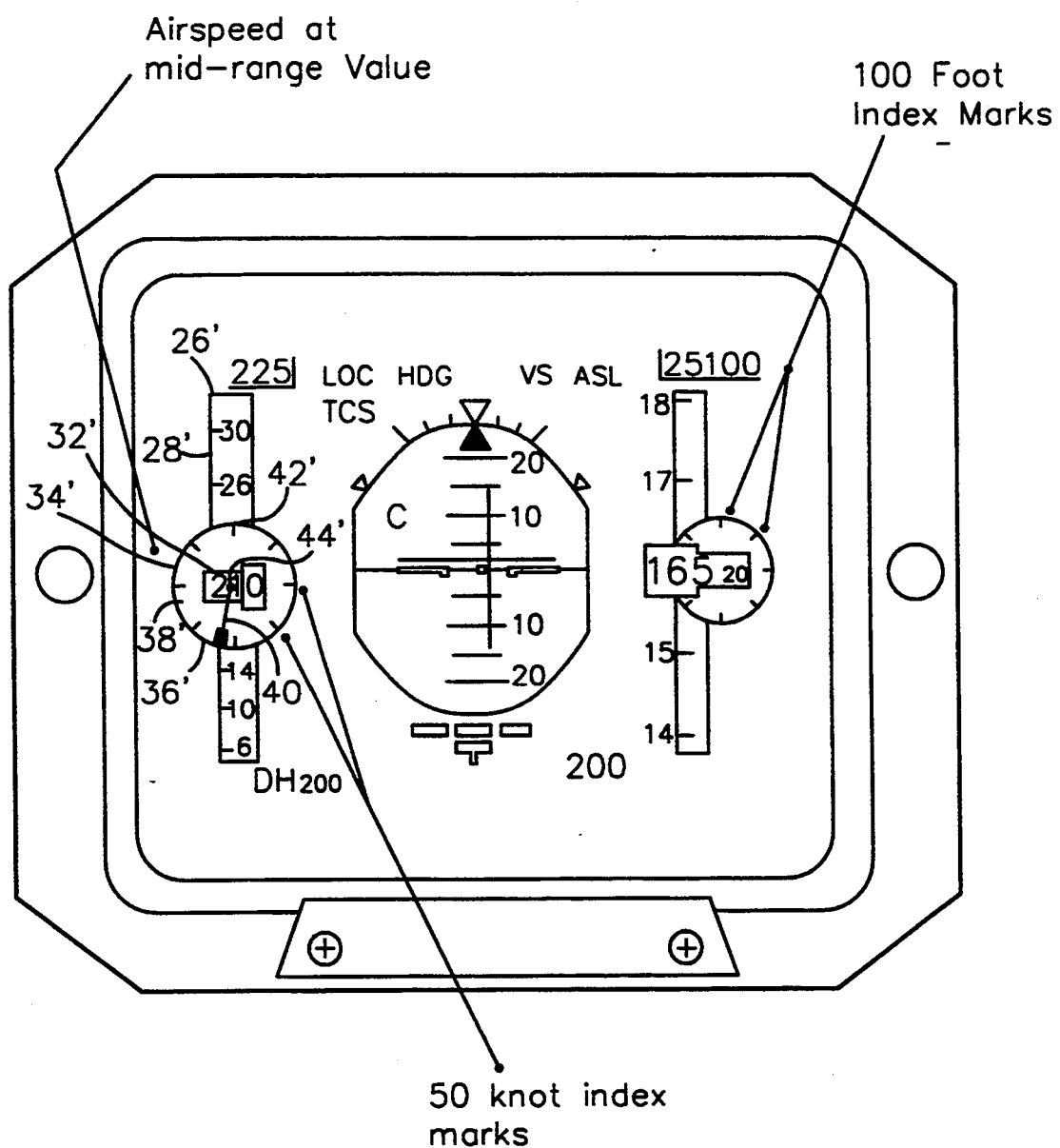
FIG. 2 is a frontal view of an alternative embodiment of the primary flight display shown in FIG. 1.

FIG. 1 illustrated an airspeed in the lower portion of the range of vertical tape display 28, i.e., 112 knots. FIG. 2 shows an example of an airspeed value nearer to the mid-range of vertical tape display 28'. In FIG. 2, a present value of 210 knots is shown. In FIG. 2 the reference numerals include the symbol ' for the similar items for FIG. 1.

Altitude presentation or altimeter 50 makes optimum use of available display area located on the right side of EADI 16. The altimeter display of the present invention provides a unique combination of a vertical tape 52 a window display 56 and a round dial display 58. Movable tape 52 displays a range of altitudes with a present value of altitude displayed digitally in window 56, e.g., 16,520 is shown in FIG. 1. Round dial 58 is configured so that pointer 64 makes a complete revolution on dial face 62 for a predetermined change in altitude. For example indices 66 could be spaced to correspond to an altitude change of 100 feet between indices so that a complete revolution of pointer 64 would correspond to 1000 feet change in altitude. It will be appreciated that round dial 58 would then impart information through the direction of rotation of pointer 64, i.e., clockwise rotation for increasing altitude and counterclockwise for decreasing altitude. In addition round dial 58 will impart information through the rate of rotation of pointer 64. Thus altitude display provides a unique altimeter arrangement with vertical movable tape 52 providing a "coarse" altitude scale and round dial 58 providing a "fine" altitude scale.

In accordance with the foregoing description, Applicants have developed unique configurations for the airspeed display portion and the altimeter portion of a primary flight display. Applicants' invention can be readily incorporated into the display space available in typical primary flight displays.

Although a specific embodiment of Applicants' invention is shown for illustrative purposes, a number of variations will be apparent to those of ordinary skill in the relevant arts. It is not intended that coverage be limited to the disclosed embodiment, but only by the terms of the following claims.

We claim:

1. A primary flight display for an aircraft, comprising:
   a display field including a central attitude indicator;
   a vertically disposed, movable airspeed scale on a first side of said central attitude director;
   a first window for digital display located along said movable airspeed scale;
   a first dial having a first movable indicator located along said movable airspeed scale;
   means responsive to the airspeed of said aircraft for moving said first movable indicator to display macro airspeed information on said dial and moving said airspeed scale relative to said window to display airspeed in said window;

a vertically disposed movable altitude scale on a second side of said central attitude director;

a second window for digital display located along said movable altitude scale;

a second dial having a second movable indicator located along said movable altitude scale;

means responsive to the altitude of said aircraft for moving said second movable indicator in response to a change in aircraft altitude and moving said altitude scale relative to said second window to display altitude in said second window.

2. Primary flight display of claim 1 wherein said first dial is superimposed on said movable airspeed scale.

3. Primary flight display of claim 2 wherein said first window is located within said first dial.

4. Primary flight display of claim 1 wherein said first dial is generally circular and said first movable indicator is rotatable.

5. Primary flight display of claim 3 wherein said first dial location relative to said movable airspeed scale is fixed.

6. Primary flight display of claim 3 wherein said first dial location relative to said movable airspeed scale is responsive to airspeed.

7. Primary flight display of claim 3 wherein said second dial is superimposed on said movable altitude scale.

8. Primary flight display of claim 7 wherein said second window is located within said second dial.

9. Primary flight display of claim 1 wherein said first dial is configured as a primary speed awareness cue providing a global perspective of airspeed by the position of said first movable indicator.

10. Primary flight display of claim 2 wherein said second dial and said second movable indicator are configured to provide a complete revolution of said second movable indicator for a predetermined change in altitude.

11. Primary flight display of claim 10 wherein said predetermined change in altitude is 1000 feet.

12. A primary flight display for an aircraft, comprising:

a display field including a central attitude indicator;

a vertically disposed, movable airspeed scale on a first side of said central attitude director;

a first window for digital display located along said movable airspeed scale;

a first dial having a first movable indicator, said first dial superimposed on said movable airspeed scale;

means responsive to the airspeed of said aircraft for causing said first dial and said first movable indicator to display global airspeed information and for moving said airspeed scale relative to said window to display airspeed in said first window, a vertically disposed movable altitude scale on a second side of said central attitude director;

a second window for digital display located along said movable altitude scale;

a second dial having a second movable indicator, said second dial superimposed on said movable altitude scale, means responsive to the altitude of said aircraft for moving said second movable indicator in response to a change in aircraft altitude with a complete revolution of said movable indicator corresponding to a predetermined change in aircraft altitude and for moving said altitude scale relative to said second window to display aircraft altitude in said second window.

13. Primary flight display of claim 12 wherein said first window is located within said first dial and said second window is located within said second dial.

* * * * *